United States Patent [19]
Summerauer et al.

[11] Patent Number: 5,468,931
[45] Date of Patent: Nov. 21, 1995

[54] TOOL ASSEMBLY FOR A PUNCH PRESS HAVING A LASER WELDING APPARATUS

[75] Inventors: Ingomar J. K. Summerauer; Waldemar Hellwig, both of Arbon, Switzerland

[73] Assignee: Bruderer AG, Frasnacht, Switzerland

[21] Appl. No.: 126,062

[22] Filed: Sep. 23, 1993

[30] Foreign Application Priority Data

Oct. 23, 1992 [CH] Switzerland ............... 03300/92

[51] Int. Cl.⁶ .................................................. B23K 26/00
[52] U.S. Cl. ................... 219/121.63; 219/121.6; 219/121.78
[58] Field of Search .............. 219/121.63, 121.6, 219/121.61, 121.67, 121.7, 121.76, 121.78, 121.79, 121.68, 121.73, 121.82

[56] References Cited

U.S. PATENT DOCUMENTS

| Re. 31,042 | 9/1982 | Clark et al. | 219/121.63 |
| 4,335,296 | 6/1982 | Bredow | 219/121.63 |
| 4,654,505 | 3/1987 | Sciaky et al. | 219/121.6 |
| 5,008,510 | 4/1991 | Koseki | 219/121.7 |
| 5,053,601 | 10/1991 | Landtwing et al. | 219/121.63 |

FOREIGN PATENT DOCUMENTS

0343661 5/1989 European Pat. Off. .

Primary Examiner—Tu Hoang
Attorney, Agent, or Firm—Ladas & Parry

[57] ABSTRACT

The supporting block for the focusing device of a laser welding apparatus is mounted onto the working surface of the body of the lower tool. The cutting edge of the die set into the body of the lower tool is aligned with the working surface. For a resharpening of the cutting edge the working surface is reground and accordingly also the area, on which the supporting block rests. Conclusively, no readjusting of the focusing device relative to the welding point at the die is necessary.

7 Claims, 5 Drawing Sheets

TOOL ASSEMBLY FOR A PUNCH PRESS HAVING A LASER WELDING APPARATUS

BACKGROUND OF THE INVENTION

1. Field of the Invention

The present invention relates to a tool assembly for a punch press having at least one laser welding apparatus. The laser welding apparatus includes a focusing device and at least one supporting block for a guided supporting of said focusing device of the laser welding apparatus. The focusing device features a predetermined focal length and a predetermined focal point. The tool assembly includes further a body having a working surface with at least one recess for a die to be inserted thereinto. The die has a cutting edge which is aligned with a surface portion of the working surface of said body. The supporting block is designed and arranged in such a manner that a laser beam emitted by the focusing device mounted to the supporting block is focused to a predetermined point at the die corresponding to the focal point of the focusing device such to perform a welding operation at a workpiece located thereat. The supporting block includes at least one guiding surface for positioning the supporting block relative to the focal point at the die.

2. Description of the Prior Art

Punch presses, of which the operation encompasses additionally to a mechanical punching of workpieces also a welding thereof by means of a laser welding apparatus, are utilized, for instance, for the production of stacks of plates or metal sheets used in electrotechnical products. Examples of such products are packages of plates used for laminated yokes of an electrical device or also for stators and rotors of electromotors. The individual plates or metal sheets are individually punched and stacked, whereby the stacking is, for instance, achieved, in that a braking member is located in or below a die cooperating with a punch. When stacking the consecutively punched plates, each plate set onto the stack is welded at at least one location to the previously stacked plate located thereunder, for instance, by means of a laser beam, whereby the beaming of the laser beam proceeds commensurate with the operating cycle of the punch press. The laser welding of the stamped plates to the stack located in the die proceeds until a predetermined number of individual plates has been welded together to form a stack of plates. Thereafter no welding is performed during a next following punching stroke of the punch press, such that finally the welded stack of plates is urged out and away from the braking member by the next following stack of plates punched into the die.

The die, also called female die or bottom die, is generally a sleevelike product made of a hard metal, which is set into a corresponding opening in the lower tool of the punch press and located specifically in such a manner that the cutting edge of the die is aligned with the operating surface of the lower tool.

As is generally known, the cutting edges of the dies are subject to wear during prolonged operation and it is generally known that the tools, i.e. specifically their working surfaces, are periodically ground in order to obtain again the original sharpness of the cutting edge(s).

The sheets or plates which are stamped are extremely thin and due to this reason and also due to reasons of welding techniques it is necessary to set the respective welding points of the laser beam welding with tolerances of a few 1/100 mm. This demand causes obviously a correspondingly precisely located mounting of the optical part, the focusing device of the laser welding apparatus, of which the focal depth or distance and the focal point determine the respective welding point. The focusing devices of laser welding apparatuses are commonly mounted to a part of the frame or also to a tool of the punch press and are initially set when setting up the punch press such as all the cutting, grooving, etc. tools thereof with a high precision.

If now the tool is dismounted and removed in order to newly grind the working surface due to the reason mentioned above, all focusing devices mounted thereonto must be adjusted newly after assembling the tool in the punch press because due to mentioned grinding the location of the welding points are now shifted relative to the earlier, initial focal point of the focusing device. This new adjusting and setting up of the focusing devices is a tedious, time consuming process.

SUMMARY OF THE INVENTION

It is, therefore, a general object of the present invention to provide a tool assembly for a punch press having at least one laser welding apparatus, in which no new setting and adjusting of the focusing device is necessary after a grinding of the working surface of the tool.

A further object of the invention is to provide a tool assembly for a punch press having at least one laser welding apparatus which comprises a supporting member having a positioning surface, on which the supporting block rests in such a manner that its guiding surface contacts the positioning surface of the supporting member, which positioning surface is adapted and arranged to set the height position of the focusing device relative to the surface portion of the working body which is aligned with the cutting edge of the die, and which positioning surface of the supporting member is aligned with the surface portion of the body.

Still a further object is to provide a tool assembly for a punch press having at least one laser welding apparatus which includes at least two positioning pins inserted into recesses in the supporting block and in the supporting member, which positioning pins have longitudinal center axes arranged in such a manner that they determine a plane which comprises the optical axis of the focusing device lined up with the focal point corresponding to the predetermined point of the die where a welding operation is to be performed. Such a design allows that the lateral dimensions of the supporting block can be kept small, such that it is possible to mount a plurality of focusing devices aiming at one given die in a space saving manner to the body of the tool.

BRIEF DESCRIPTION OF THE DRAWINGS

The present invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
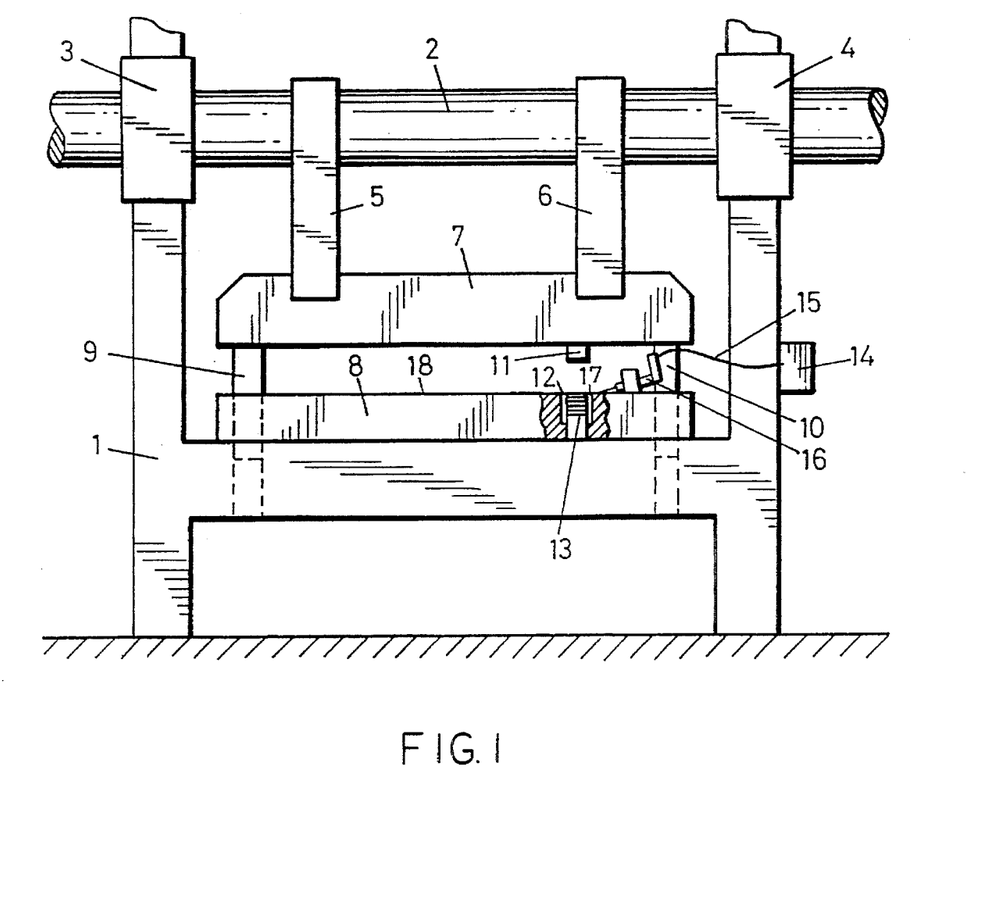
FIG. 1 illustrates schematically a punch press equipped with a laser welding apparatus.

FIG. 1 illustrates on a purely schematic basis only, a punch press which is equipped with a laser welding apparatus. The punch press includes a frame 1, in which a eccentric shaft or crankshaft 2 is supported for rotation in bearings 3, 4. The eccentric shaft 2 is driven according to well known principles by a driving motor (not shown), for instance, via a belt drive. Two connecting rods 5, 6 are supported on the eccentric shaft 2 and pivotally connected at their lower ends to a so-called ram 7, which in turn carries generally an upper tool (not shown). The frame 1 supports, furthermore, a so-called lower tool 8. Guide columns 9, 10 project from the ram 7, to guide the ram 7 in its vertical reciprocating movement.

A tool, e.g. punching tool 11, is set into the upper tool to cooperate with a die 12 located in the lower tool 8. The punching tool 11 and die 12 cooperate to stamp out plates from a sheet metal band (not shown) which is fed from the left to the right. The plates are e.g. for rotors of an electrical machine and are united in the lower tool 8 into a stack 13. Hereby punching tool 11 and die 12 form the last tool-pair of a consecutive working of a sheet metal band or strip, which was previously worked on by other press tools while being moved to the right between the upper tool and the lower tool 8 multiple press tools after earlier working performances made thereon for the production of the final product punched out of the sheet metal strip such as well known to persons skilled in the art.

A laser generator 14 is mounted to the frame 1. The laser generator 14 communicates via optical conductors 15 (of which only one is illustrated), e.g. glass fiber cables with a focusing device 16, which is located on the lower tool 8.

For the sake of completeness it shall be mentioned, furthermore, that a braking means or member 17 is located in the die 12. This braking member 17 acts e.g. by friction on the stamped out plates located in the die 12 in order to hold the plates in the die 12, the plates being pushed down step by step by every consecutive plate punched out of the sheet metal web until the punched plates or, more precisely, the entire united-plate stack 13 has passed the braking member 17. The stacked plates thereafter glide or fall out of the lower tool 8 under the influence of gravity.

In operation the eccentric shaft 2 rotates and causes via the connecting rods 5, 6 the punching movement of the ram 7 together with the upper tool mounted thereto for the production of the individual plates, which remain at the last operating step in the die 12. Accordingly, during every working stroke of the ram 7 one punched out plate is placed in the die 12 onto a preceding plate located already in the die. As soon as the punch 11 has moved a small distance away from the die 12 during the upwards stroke of the ram the laser welding apparatus 14, 15, 16 beams a laser beam of an extremely short duration towards the point of contact between the plate which just has been deposited in the die and the preceeding plate already present in the die and located thereunder such as to weld the two plates together. The operating cycles or beam timing of the laser welding apparatus is obviously controlled by the position of the punching tool 11 relative to the die 12 or, more generally, from the rotational position of the eccentric shaft 2. After a predetermined number (e.g. 20) of individual plates have been welded together into the stack 13, the welding apparatus is controlled such that, during one punching cycle no welding is performed, whereby the production of the one stack of plates 13 is terminated and the production of the next following stack can begin. Finally, the one welded stack of plates is pushed enough downwards by the following plates to pass out of the braking member.

It has already been explained that the cutting edge of the die 12 (and obviously also of the punching tool 11) gets worn, such that the entire working surface 18 of the lower tool must be reground in order to resharpen the cutting edge of the die 12.

After regrinding the working surface of the tool, has obviously been lowered somewhat, and, a welding point in the die has also been subjected to a relative change of the location such that a new adjusting of at least the focusing device 16 of the laser welding apparatus heretofore was needed. By the present invention, of which one exemplary embodiment is illustrated in FIGS. 2 and 3, a new adjusting of the focusing device 16 is no longer necessary.

Figure 2:
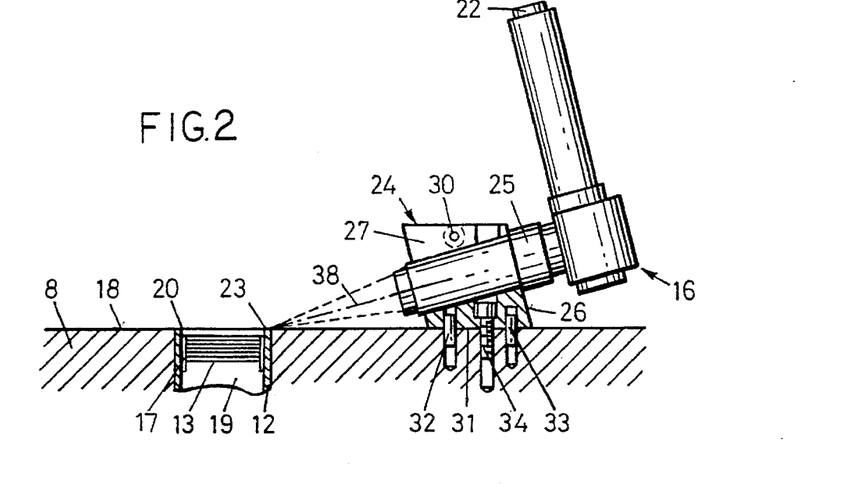
FIG. 2 is a side view, partly in section of a part of a tool body having a focusing device held in a supporting block.

FIG. 2 illustrates a section through a part of the lower tool 8 having a die 12, which is set into a recess or through bore 19 in such a manner that its cutting edge 20 is aligned with the working surface 18 of the tool. The braking member 17 in the die 12 is for instance a portion thereof having a somewhat decreased diameter achieved by any known procedures. A stack 13 of stamped individual stator plates (21 in FIG. 3) which have been welded together are illustrated to be in the die 12.

Figure 3:
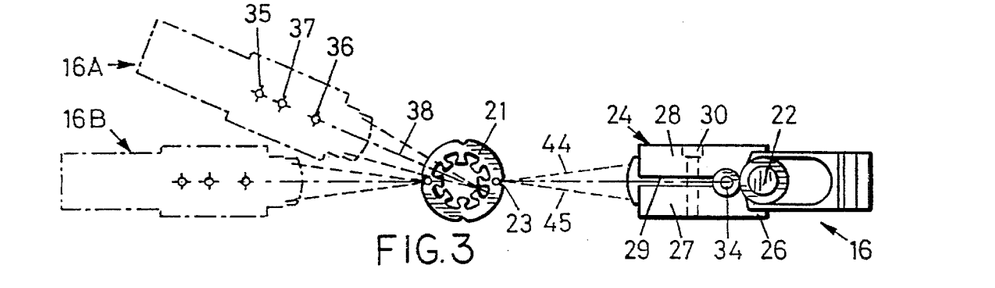
FIG. 3 is a top view of a portion of a tool body having three focusing devices mounted thereonto.

According to the top view of FIG. 3 the stator plates 21 are punched and welded together to the stack (13 in FIG. 2). As can be seen clearly, three focusing devices 16, 16A, 16B are present, such that the respective plates are welded together at three points. Of these focusing devices one is shown by full lines, namely device 16 and the other two focusing devices 16A, 16B are illustrated by dash dotted lines.

The focusing devices are connected to a laser generator common to all focusing devices via a respective glass fiber cable coupled at 22 to the respective focusing device.

Such focusing devices are generally known and, therefore, there is no need of a detailed description thereof.

Below, the embodiment will be described merely by reference to the focusing device 16. The focusing device 16 includes a preset or predetermined focal length and a predetermined focal point, which latter determines the welding point 23 at two plates 21. To this end the focusing device 16 is set into a supporting block 24 and includes a collar 25, via which it contacts one side surface 26 of the supporting block 24. The surface 26 acts as guiding surface for the focusing device 16 and extends now precisely perpendicularly to the optical axis 38 of the focusing device 16. The supporting block 24 is machined with such a preciseness and located at a position which has such a precisely determined distance from the welding point 23 and is mounted with such precisely produced mounting members to the body of the lower tool 8, that the welding point determined by the optics of the focusing device 16 is maintained precisely. The preciseness is in a range of ¹⁄₁₀₀ mm. A corresponding precision is also at the contact surface of the collar 25 of the focusing device present, which contact surface contacts surface 26 of the supporting block 24.

The supporting block 24 is basically a clamplike structure having two jaws 27, 28, which at their sides facing each other are structured with an elongated recess such that a through hole extends through the supporting block 24 for receipt and the mounting of the focusing device 16. At the top the two jaws 27, 28 are separated from each other by a slot 29 and interconnected by a threaded bolt 30. Tightening the threaded bolt 30 clamps, the focusing device 16 in the supporting block 24.

The working surface 18 of the lower tool 8 acts as a positioning surface for the supporting block 24, and this positioning surface is aligned with the cutting edge 20 of the die 12, which is set into the body of the lower tool 8. The bottom surface of the supporting block 24, via which bottom surface the supporting block rests on the working surface 18, acts now as guiding surface 31, because it sets and determines at least the height position or level of the focusing device 16 inserted in the supporting block 24. The location and the position of the focusing device 16 in the supporting block 24 determine among other things the location of the welding point 23 at the die 12.

The horizontal distance between the supporting block 24 and, specifically, its side surface 26 and the welding point 23 and accordingly the surface 26 of the supporting block 24 (measured along the working surface 18) is determined by two positioning pins 32, 33, which are set into bores arranged in the supporting block 24 and in the body of the lower tool 8. The supporting block 24 itself is mounted by means of a threaded bolt 34 to the body of the lower tool 8. The longitudinal center axes 35, 36 of the positioning pins 32, 33 and the longitudinal center axis 37 of the screw bolt 34 (due to reasons of clarity the longitudinal center axis 37 is only illustrated at the focusing device 16A in FIG. 3) are aligned with each other along a straight line, i.e. they determine a plane, in which the optical axis 38 of the focusing devices 16 lies. This feature allows that the supporting block 24 can be built quite narrow, i.e. with a small lateral dimension, such that it is possible to mount in a strongly restricted space a plurality of focusing devices 16 of the laser welding apparatus acting at one and the same die 12 such that two respective plates in the plate stack 13 can be welded together simultaneously at a plurality of points.

It is to be noted that a modified design can be present at the surface 26 of the supporting block 24. It is possible to have a disc having an outer thread screwed into the supporting block 24, which in order to precisely set the distance of the accordingly now adjustable surface 26 from the welding point 23 can be screwed further into the supporting block 24 or somewhat out of the supporting block and then be arrested in the correct, desired position.

Figure 4:
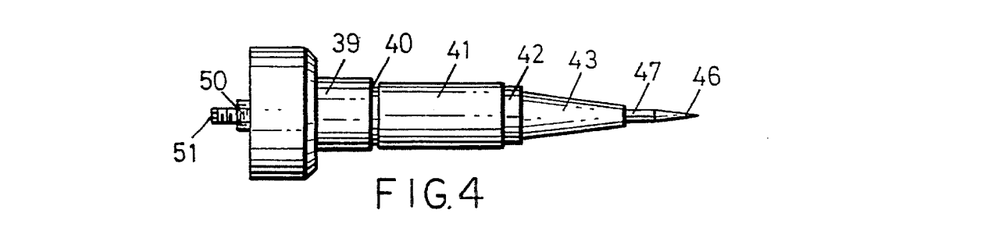
FIGS. 4 and 5 are a side view of and a section through a checking tool for a focusing device.
Figure 5:
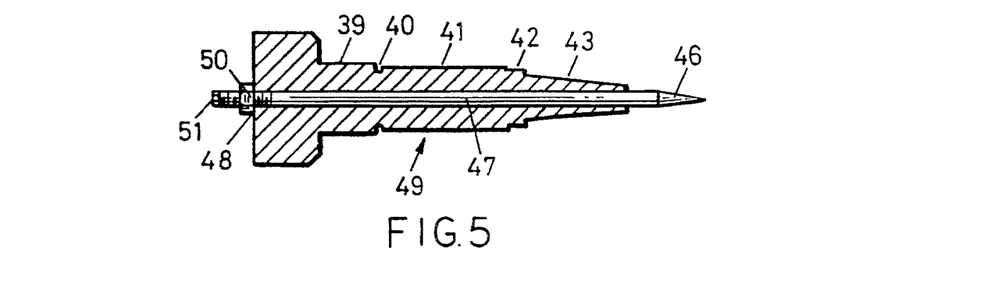

In order to check at least at a first mounting if the position of the supporting block 24 is correct and also to check that the path of the laser beam laser beam cannot impact onto other parts of the tool and tools or workpiece which are not to be welded and, specifically, to prevent the laser beam impacting onto a location ahead of the welding point a checking tool is used, which is illustrated in FIGS. 4 and 5 and which can be termed checking mandrel.

The checking tool includes a main body having a first portion 39, which corresponds in its design to the collar 25 of the focusing device 16. The shoulder 40 which is to rest onto the surface 26 of the supporting block 24, which surface 26 is a guiding surface and onto which surface 26 the corresponding surface of the collar 25 of the focusing device 16 will lie when the focusing device 16 is mounted in the supporting block 24. The shoulder 40 of the checking tool is followed by a cylinder shaped portion 41, of which the diameter and the length correspond exactly to the diameter and the length of that portion of the focusing device 16 which is held and supported in the supporting block 24. The next following, short cylinder shaped portion 42 corresponds regarding diameter and length also to the corresponding portion of the focusing device 16.

An important portion is the cone-like converging portion 43 following mentioned portion 42. Its enveloping surface corresponds namely to the cone-shaped enveloping surface of the beam of rays emitted by the focusing device 16, which enveloping surface is shown and identified specifically in FIG. 3 by the broken lines identified by the reference numerals 44 and 45.

A needle 47 extends in an axial direction through the main body of the checking tool, which needle 47 has a tip portion 46. The enveloping surface of this tip portion 46 corresponds further to the enveloping surface of the beam of laser rays.

The needle 47 has an outer thread 48, by means of which it is screwed into the main body 49. The needle 47 is, furthermore, locked relative to the main body 49 by a nut 50.

For an initial setting the needle 47 is adjusted by means of a screwdriver placed into the slot 51 in such a manner that the distance between the shoulder 40 and its frontmost tip corresponds exactly to the distance between the welding point 23 in the die 12 and the surface 26 of the supporting block 24 acting as guiding surface and thereafter the needle 47 is locked by a tightening of the nut 50. The exactness of the set distance lies within a range of a few ¹⁄₁₀₀ mm.

The measuring tool which has been set as described above is now inserted in place of the focusing device 16 into the supporting block 24 and is clamped therein by a tightening of the threaded bolt 30. The tip of the needle 47 is then located exactly at the focal point, i.e. at the welding point at the die 12.

The enveloping surfaces of the coned shaped portion 43 and of the tip portion 46 of the checking tool play an extremely important role. These enveloping surfaces are not to contact any obstacle. Such an obstacle can be, e.g. a part of a workpiece, a part of a tool or a part of a mounting member at the lower tool 8 and such parts would be partly exposed to the laser beam and accordingly could be heated such to be damaged and also could partly deflect the laser rays. Furthermore, such as illustrated in FIG. 3, the three beams of rays do not intersect each other, they cannot influence each other and also this arrangement of the beams of rays can be exactly checked by the checking tool.

After the checking has been made, the focusing device 16 or the focusing devices 16, 16A, 16B, are inserted into the corresponding supporting block 24, optically connected to the laser generator 14 and thereafter the punch press can be operated.

If a regrinding, a resharpening of the cutting edge 20 of the die 12 (i.e. of all cutting edges present in the lower tool)

is to be performed, the lower tool is removed, whereby the focusing device 16 has been removed previously and thereafter the supporting block 24 is removed from the body of the lower tool 8 by a loosening of the threaded bolt 34.

Thereafter, the working surface 18 of the tool is reground in a manner as generally known in order to resharpen the various cutting edges. Important is now the fact that during the grinding not only the area of the body of the lower tool 8 at the die 12 but also simultaneously and by the same measure also the area of the positioning surface of the body of the lower tool 8 is ground, which positioning surface determines the height position of the supporting block 24 and correspondingly also of the focusing device 16. Accordingly, after mentioned working, i.e. grinding, the supporting block 24 can be again mounted to the body of the lower tool 8 without any further ado and the focusing device 16 can again be mounted into the supporting block 24. A time-consuming and tedious readjusting specifically of the supporting block 24 relative to the welding point which now has not shifted relative to the positioning surface is not necessary.

Figure 6:
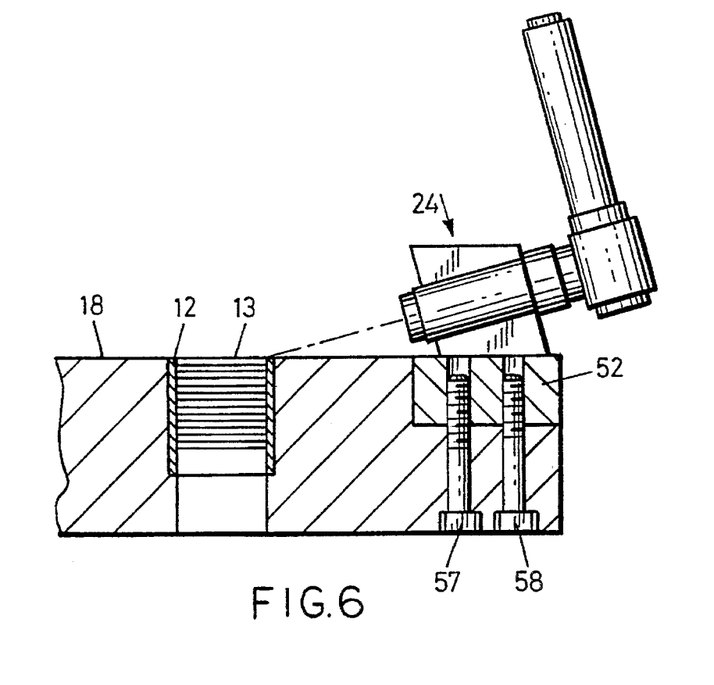
FIGS. 6 and 7 illustrates embodiments, in which the supporting block is mounted to a separate supporting structure mounted in turn to the lower tool.
Figure 7:
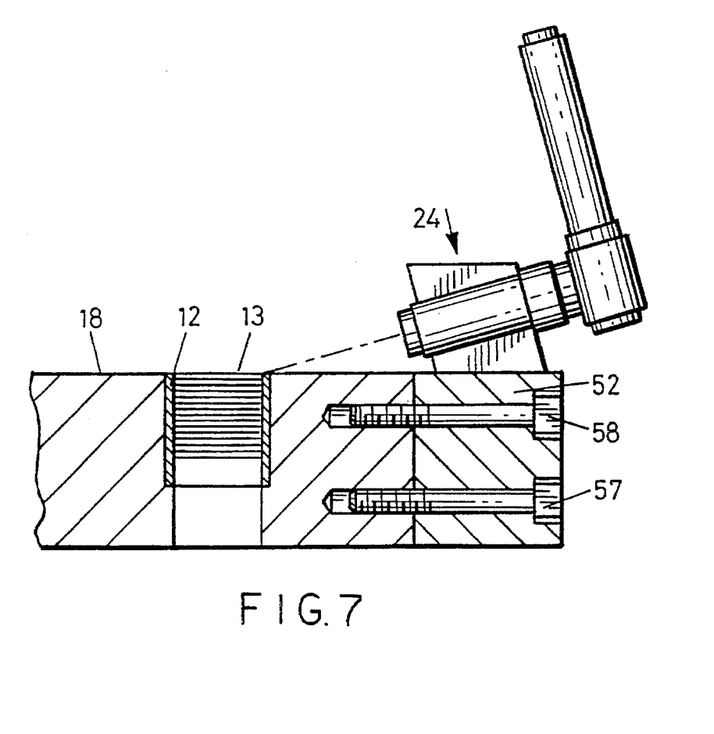

FIGS. 6 and 7 illustrate modifications, at which the supporting block 24 of the focusing device 16 is not directly mounted to the tool body 8. In these modifications the supporting block 24 is located on a separate supporting member 52. This blocklike supporting member 52 can be, for instance, set into the body of the lower tool 8 at an edge area thereof such as illustrated in FIG. 6 or, according to the embodiment illustrated in FIG. 7, the supporting member 52 can be mounted at a side of the body of the lower tool 8. The connection can be achieved by the exemplary illustrated threaded bolts 57, 58. It is not important where and how this supporting member 52 is mounted to the body of the lower tool 8. Decisive is that the free surface, on which the supporting block 24 of the focusing device 16 rests via its guiding surface 31 is aligned with the working surface 18 of the body of the lower tool 8 and is also ground during the regrinding of the working surface 18.

During a welding operation welding smoke and welding vapors are produced, which must be removed, as commonly known. It is known to form bores in the tool for the purpose of this removal.

Figure 8:
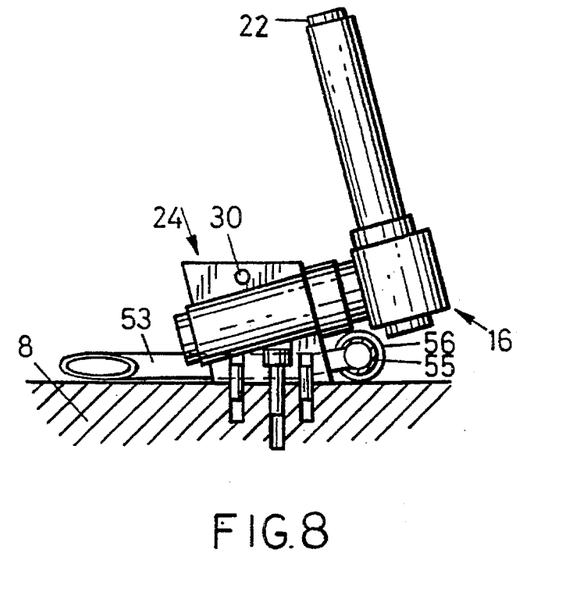
FIG. 8 is an illustration corresponding to FIG. 2 and depicts an embodiment of suction channels for vapors produced during welding.
Figure 9:
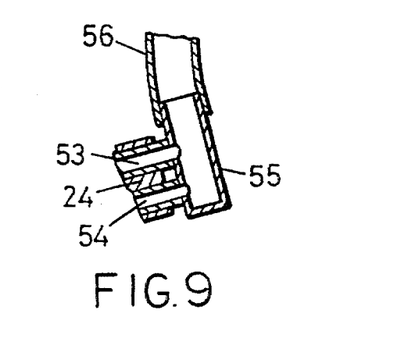
FIG. 9 illustrates a detail of FIG. 8.
Figure 10:
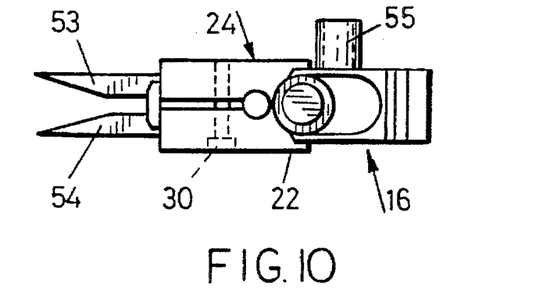
FIG. 10 is a top view of the embodiment illustrated in FIG. 8.

FIGS. 8–10 illustrate an advantageous variant, in which no such bores in the tool are needed. The supporting block 24 is equipped with suction channels 53, 54. These are designed as through bores in the supporting block 24, which receive at the side of the area of the welding short tubes having chamfered ends. At their opposite end the through bores communicate with a rigid manifold 55. A possibly flexible suction line 56 connects to this manifold 55. The illustrated embodiment is extremely effective and advantageous because the tube stubs can be dimensioned and shaped in such a manner that they can be led independently from a given welding area as close as possible to the location of the vapors produced during the welding. Furthermore, in case of a plurality of focusing devices 16, e.g. according to the arrangement of FIG. 3, not all supporting blocks 24 present must include suction channels. It is also possible to provide one or the other supporting block 24 with only one suction channel, such that a drawing off, removing of the welding vapors can be optimized in accordance with the local conditions.

FIGS. 11–14 illustrate further modifications. The focusing device 16, which, as is the case of all embodiments is of a vibration-proof design and has a gastight, calibrated casing for an exactly positionable receipt in the supporting block 24, has one single suction channel 59. The suction channel 59 extends along the casing and includes a first portion 61, which has a somewhat elongate cross-sectional shape corresponding to a broad slit nozzle, which portion 61 is followed by a portion 62 having a circular cross-sectional shape. In comparison with the embodiment having the two suction channels 53, 54 the suction channel 59 features a larger cross section but requires not a substantially larger space.

Figure 11:
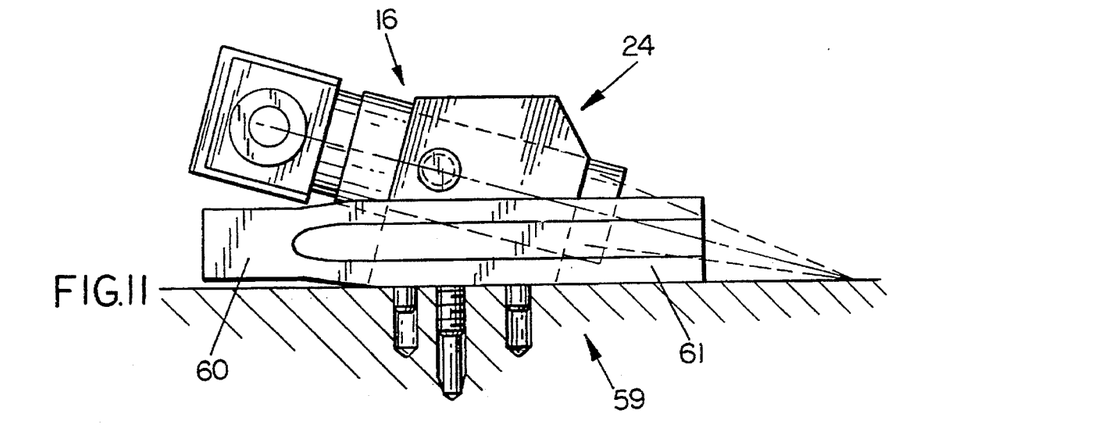
FIG. 11 is a side view of an embodiment having one single suction channel.
Figure 12:
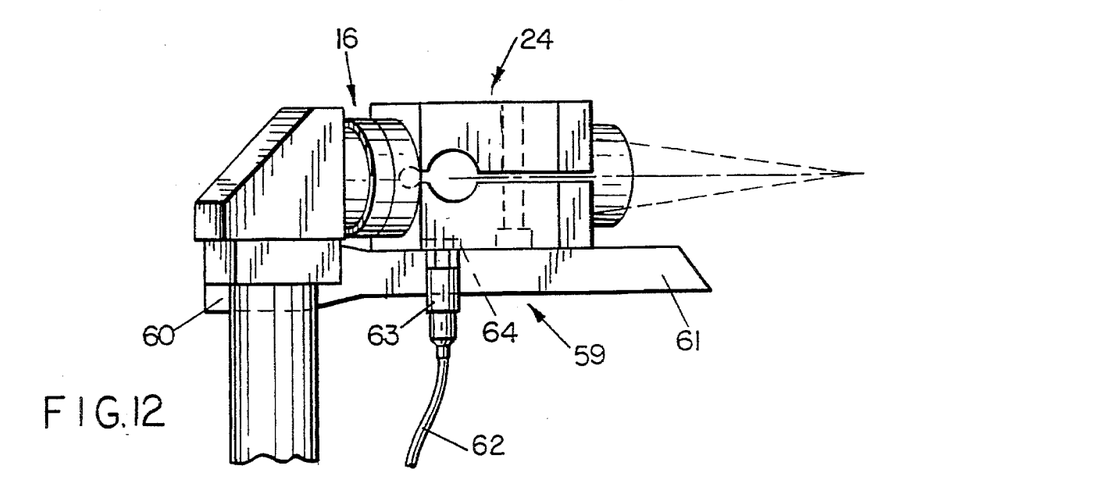
FIG. 12 is a top view of the embodiment according to FIG. 11.
Figure 13:
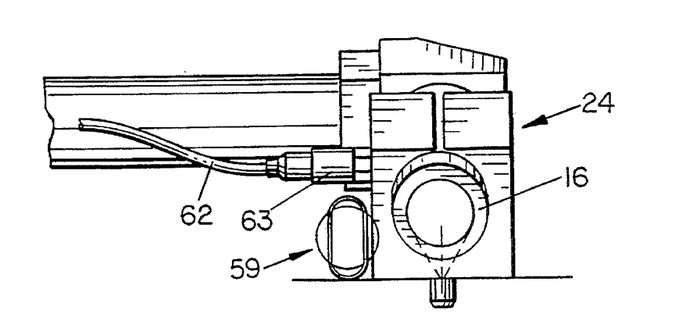
FIG. 13 is a front view of the embodiment illustrated in FIG. 11.
Figure 14:
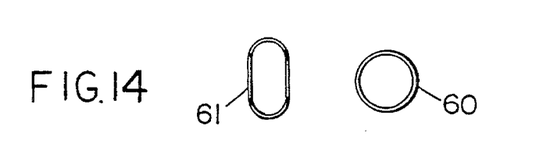
FIG. 14 illustrates the cross-sectional shapes of the two sections of the suction channel of FIG. 11.

FIGS. 11–13 illustrate, furthermore, a safety arrangement which for sake of clarity has not been illustrated in the initial embodiments.

Obviously and as generally known a laser system features a considerable danger of injury to operators, to people because the laser beams have an extremely high energy. Therefore, it must be ensured that the laser beams are beamed only when the focusing device is mounted on the tool and that the laser generator is switched off when any focusing devices connected thereto are removed.

A cable 62 runs from the (not particularly illustrated) control apparatus of the laser generator to the focusing device, i.e. to each focusing device. Two electrical conductors forming an electrical current circuit are located in this cable 62, which circuit must be closed to allow a switching on of the laser generator. The cable 62 ends at a plug 63, which in order to be mounted to the casing or the supporting block of the focusing device must be plugged in and screwed on. After having been plugged in and screwed on, the plug 63 contacts a plug socket 64 (FIG. 12), in which an electrical bridge is present, by means of which the electrical circuit is closed allowing a switching on of the laser generator.

While there are shown and described present preferred embodiments of the invention, it is to be distinctly understood that the invention is not limited thereto, but may be otherwise variously embodied and practiced within the scope of the following claims.

We claim:

1. A tool assembly for a punch press comprising:

at least one laser welding apparatus, said laser welding apparatus including a focusing device and at least one supporting block for a guided supporting of said focusing device, said focusing device having a predetermined focal length and a predetermined focal point;

a lower tool having a working surface, which has at least one recess at which a die is inserted, said die having a cutting edge which is aligned with said working surface;

said supporting block being designed and arranged so that a laser beam emitted by said focusing device when mounted to said supporting block is focused to a predetermined welding point at the die which corresponds to said predetermined focal point of said focusing device to perform a welding operation on workpieces located thereat;

said supporting block including at least one side guiding surface for positioning said focusing device relative to said predetermined welding point;

said supporting block having a bottom guiding surface for resting on a supporting surface to set a height position of said focusing device relative to said working surface.

2. The tool assembly of claim 1, and further comprising positioning means acting between said working surface and said supporting block for fixing a distance between said supporting block and said predetermined welding point.

3. The tool assembly of claim 2, in which said positioning means comprise at least two positioning pins inserted into recesses in said supporting block and in working surface, said positioning pins having longitudinal center axes arranged so that they determine a plane of an optical axis of said focusing device to said predetermined welding point.

4. The tool assembly of claim 3, in which said side guiding surface extends perpendicularly to said optical axis, said focusing device having an abutment surface extending perpendicularly to said optical axis for abutting said side guiding surface.

5. The tool assembly of claim 1, in which said supporting surface is said working surface.

6. The tool assembly of claim 1, in which said supporting surface is on a separate supporting structure mounted to said lower tool.

7. The tool assembly of claim 1, and further comprising at least one suction channel for a drawing off smoke and vapors produced during said welding operation, said suction channel extending from a side of said supporting block.

* * * * *